United States Patent
Peng

(10) Patent No.: US 9,939,675 B2
(45) Date of Patent: Apr. 10, 2018

(54) COLOR FILTER SUBSTRATE, LIQUID CRYSTAL DISPLAY PANEL AND LIQUID CRYSTAL DISPLAY

(71) Applicant: WUHAN CHINA STAR OPTOELECTRONICS TECHNOLOGY CO., LTD., Wuhan, Hubei (CN)

(72) Inventor: Haibo Peng, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 15/342,211

(22) Filed: Nov. 3, 2016

(65) Prior Publication Data

US 2017/0242294 A1    Aug. 24, 2017

(30) Foreign Application Priority Data

Feb. 18, 2016  (CN) .......................... 2016 1 0090056

(51) Int. Cl.
    *G02F 1/1335*   (2006.01)
    *G02F 1/13363*  (2006.01)

(52) U.S. Cl.
    CPC .... *G02F 1/133514* (2013.01); *G02F 1/13363* (2013.01); *G02F 1/133528* (2013.01); *G02F 2001/133638* (2013.01); *G02F 2201/52* (2013.01)

(58) Field of Classification Search
    CPC .......... G02F 1/133514; G02F 1/13363; G02F 1/133528; G02F 2201/52; G02F 2001/133638; G02F 1/0063; G02F 1/0131; G02F 1/1395; G02F 2413/00
    See application file for complete search history.

(56) References Cited

U.S. PATENT DOCUMENTS

| | | | |
|---|---|---|---|
| 2005/0200801 A1* | 9/2005 | Watanabe | G02F 1/1335 349/194 |
| 2008/0291372 A1* | 11/2008 | Higano | G02F 1/13363 349/98 |
| 2009/0135343 A1* | 5/2009 | Kitamura | G02B 5/3033 349/96 |
| 2011/0229730 A1* | 9/2011 | Yosomiya | B32B 27/08 428/500 |

(Continued)

*Primary Examiner* — Joseph L Williams
*Assistant Examiner* — Jose M Diaz
(74) *Attorney, Agent, or Firm* — Mark M. Friedman

(57) ABSTRACT

A color filter substrate, a liquid crystal display panel, and a liquid crystal display are described. The color filter substrate has: a base substrate, a color resist layer disposed on a surface of the base substrate and having a plurality of colored-filter color resists each configured to filter a stray light and emit a light corresponding to a color; an upper polarizing sheet disposed on the other surface of the base substrate; and a ¼ wavelength plate covering on the upper polarizing sheet and having a plurality of areas which are respectively corresponding to the colored-filter color resists and face toward the colored-filter color resists, respectively. An in-plane retardation Re of the ¼ wavelength plate in each of the areas satisfies: Re=$\lambda$/4, wherein $\lambda$ is a wavelength of the light corresponding to the color.

9 Claims, 1 Drawing Sheet

(56) References Cited

U.S. PATENT DOCUMENTS

| | | | | |
|---|---|---|---|---|
| 2014/0085597 A1* | 3/2014 | Katou | ................. | G02B 5/3083 |
| | | | | 349/194 |
| 2016/0185083 A1* | 6/2016 | Yasui | ........................ | B32B 7/12 |
| | | | | 428/1.55 |
| 2016/0355736 A1* | 12/2016 | Motooka | ................. | C08F 12/22 |

* cited by examiner

COLOR FILTER SUBSTRATE, LIQUID CRYSTAL DISPLAY PANEL AND LIQUID CRYSTAL DISPLAY

FIELD OF THE INVENTION

The present invention relates to a display field, and more particularly to a color filter substrate, a liquid crystal display panel, and a liquid crystal display.

BACKGROUND OF THE INVENTION

Currently, lights emitted from a liquid crystal display are mostly linear polarizing lights. Research by relevant professional organizations shows that circular polarizing lights with respect to the linear polarizing lights may cause an obvious influence on eyes. Therefore, more and more liquid crystal displays have begun to provide a mode of circular polarizing lights, in which a circular polarizing sheet is added into a normal linear polarizing sheet for transforming the linear polarizing lights into the circular polarizing lights.

However, colors of the liquid crystal displays are formed from mixing three base colors of red/green/blue. The liquid crystal displays generally have at least the three base color units, i.e. it means that the emitting lights actually consist of lights of a plurality of red/green/blue base units. However, when the circular polarizing sheet transforms the linear polarizing light into the circular polarizing light, only a single color light can be transformed in general, and the lights emitted from the three kinds of base color units cannot be transformed into circular polarizing light perfectly.

Therefore, the conventional technology has drawbacks and needs to be improved.

SUMMARY OF THE INVENTION

An object of the present invention is to provide an improved color filter substrate, a liquid crystal display panel, and a liquid crystal display, so as to solve the problem of a low transforming extent in the conventional color filter substrate, the liquid crystal display panel, and the liquid crystal display.

In order to solve the above problem, the present invention provides technical solutions as follows:

a color filter substrate is provided and comprises:
  a base substrate;
  a color resist layer disposed on a surface of the base substrate and having a plurality of colored-filter color resists, wherein each of the colored-filter color resists is respectively configured to filter a stray light and emit a light corresponding to a color;
  an upper polarizing sheet disposed on the other surface of the base substrate; and
  a ¼ wavelength plate covering on the upper polarizing sheet and having a plurality of areas, wherein the areas are respectively one-to-one corresponding to the colored-filter color resists, and the areas face toward the corresponding colored-filter color resists, respectively;
  wherein an in-plane retardation Re of the ¼ wavelength plate in each of the areas satisfies: $Re=\lambda/4$, wherein $\lambda$ is a wavelength of the light corresponding to the color.

In the color filter substrate of the present invention, the color resist layer is a red/green/blue color resist layer, a red/green/blue/green color resist layer, or a red/green/blue/white color resist layer.

In the color filter substrate of the present invention, the ¼ wavelength plate is a liquid crystal plate and has liquid crystal molecules with identical alignment angles in each of the areas, wherein a thickness d of each of the areas satisfies: $d=Re/(Nx-Ny)$, wherein Nx is a refractive index of a light in the ¼ wavelength plate in a first direction, Ny is a refractive index of a light in the ¼ wavelength plate in a second direction, wherein the first direction and the second direction are vertical to each other and are both parallel to a plane of the ¼ wavelength plate.

In the color filter substrate of the present invention, the ¼ wavelength plate is a liquid crystal plate and has an identical thickness in each of the areas, wherein the alignment angles of liquid crystal molecules of the ¼ wavelength plate in each of the areas are different predetermined values to cause $Re=\lambda/4$.

In the color filter substrate of the present invention, the color filter substrate further comprises a protective film layer disposed on the ¼ wavelength plate.

In the color filter substrate of the present invention, the upper polarizing sheet comprises a first triacetate cellulose layer, a polyvinyl alcohol layer, and a second triacetate cellulose layer, all of which are stacked in turn.

The present invention further provides a liquid crystal display panel comprising a color filter substrate, an array substrate, and a liquid crystal layer disposed between the color filter substrate and the array substrate, wherein the color filter substrate comprises:
  a base substrate;
  a color resist layer disposed on a surface of the base substrate and having a plurality of colored-filter color resists, wherein each of the colored-filter color resists is respectively configured to filter a stray light and emit a light corresponding to a color;
  an upper polarizing sheet disposed on the other surface of the base substrate; and
  a ¼ wavelength plate covering on the upper polarizing sheet and having a plurality of areas, wherein the areas are respectively one-to-one corresponding to the colored-filter color resists, and the areas face toward the corresponding colored-filter color resists, respectively;
  wherein an in-plane retardation Re of the ¼ wavelength plate in each of the areas satisfies: $Re=\lambda/4$, wherein $\lambda$ is a wavelength of the light corresponding to the color.

In the liquid crystal display panel of the present invention, the color resist layer is a red/green/blue color resist layer, a red/green/blue/green color resist layer, or a red/green/blue/white color resist layer.

In the liquid crystal display panel of the present invention, the ¼ wavelength plate is a liquid crystal plate and has liquid crystal molecules with identical alignment angles in each of the areas, wherein a thickness d of each of the areas satisfies: $d=Re/(Nx-Ny)$, wherein Nx is a refractive index of a light in the ¼ wavelength plate in a first direction, Ny is a refractive index of a light in the ¼ wavelength plate in a second direction, wherein the first direction and the second direction are vertical to each other and are both parallel to a plane of the ¼ wavelength plate.

The present invention further provides a liquid crystal display comprising a liquid crystal display panel described above.

In the color filter substrate, the liquid crystal display panel and the liquid crystal display provided by the present invention, a layer of ¼ wavelength plate is added onto an upper polarizing sheet. The ¼ wavelength plate and the upper polarizing sheet constitute a circular polarizing sheet and the ¼ wavelength plate has corresponding areas with respect to each of color filter resists of a color resist layer. In-plane retardation Re of the areas are respectively corresponding to the color filter resists facing to the area, such that the areas of the ¼ wavelength plate respectively transform the lights corresponding to the facing color filter resist into circular polarizing lights. A converse extent of a circularly polarizing light can be apparently improved, and protection of users' eyes can be enhanced.

To make the above description of the present invention more clearly comprehensible, it is described in detail below in examples of preferred embodiments with the accompanying drawings.

DETAILED DESCRIPTION OF THE PREFERRED EMBODIMENTS

The following description of the embodiments with reference to the appended drawings is used for illustrating specific embodiments which may be used for carrying out the present invention. The directional terms described by the present invention, such as "upper", "lower", "front", "back", "left", "right", "inner", "outer", "side", etc., are only directions by referring to the accompanying drawings. Thus, the used directional terms are used to describe and understand the present invention, but the present invention is not limited thereto.

In figures, elements with similar structures are indicated by the same numbers.

Figure 1:
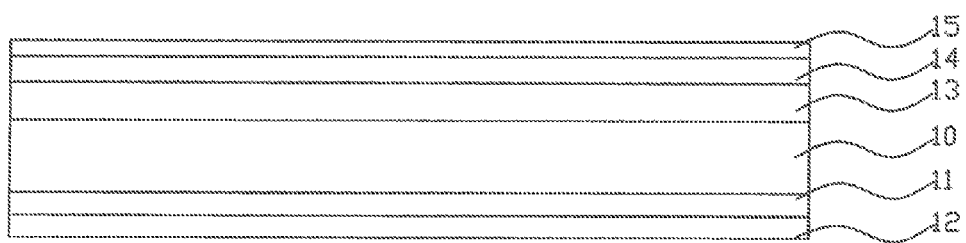
FIG. 1 is a structural schematic diagram of a preferred embodiment of a color filter substrate of the present invention.

Please refer to FIG. 1, which is a structural schematic diagram of a preferred embodiment of a color filter substrate of the present invention.

The color filter substrate in a preferred embodiment of the present invention comprises a base substrate 10, a color resist layer 11, a flat layer 12, an upper polarizing sheet 13, a ¼ wavelength plate 14, and a protective firm layer 15, wherein the color resist layer 11 is disposed on a surface of the base substrate 10 and the flat layer 12 is disposed on the color resist layer 11. The upper polarizing sheet 13 is disposed on the other surface of the base substrate 10. The ¼ wavelength plate 14 covers on the upper polarizing sheet 13. The protective film layer 15 covers and is disposed on the upper polarizing sheet 14.

Specifically, the base substrate 10 can be a glass substrate. The color resist layer 11 has a plurality of colored-filter color resists. For example, the color resist layer 11 can be a red/green/blue color resist layer, a red/green/blue/green color resist layer, a red/green/blue/white color resist layer and so on. Correspondingly, the colored-filter color resists can also be red/green/blue color resists, red/green/blue/green color resists or red/green/blue/white color resists. Each of the colored-filter color resists is respectively used to filter a stray/undesired light and emit a light corresponding to a color. For example, a red color resist is used to filter other color lights in the white light and emit a red light.

In some embodiments, the flat layer 12 is formed from silicon dioxide, silicon nitride, or mixtures thereof. Of course, other insulating materials commonly used in the liquid crystal field can also be used.

In some embodiments, the upper polarizing sheet 13 is a linear polarizing sheet comprising a first triacetate cellulose (TAC) layer, a polyvinyl alcohol (PVA) layer, and a second triacetate cellulose (TAC) layer, all of which are stacked in turn. The first triacetate cellulose layer and the second triacetate cellulose layer are mainly used to protect polarizers, fix polarizers, improve a contrast, improve a wide-angle and so on. The protective film layer 15 is used to protect the upper polarizing sheet 14.

In some embodiments, the ¼ wavelength plate has a plurality of areas, wherein the areas are respectively one-to-one corresponding to the colored-filter color resists, and the areas face toward the corresponding colored-filter color resists, respectively; wherein an in-plane retardation Re of the ¼ wavelength plate in each of the areas satisfies: Re=$\lambda$/4, wherein $\lambda$ is a wavelength of the light corresponding to the colored-filter color resist facing the area. For example, when the color resist layer is the red/green/blue color resist, the ¼ wavelength plate is corresponding to a physical structure of the color resist layer and has a plurality of R areas, G areas, and B areas. The R areas are respectively one-to-one corresponding to and face toward the red color resists; the G areas are respectively one-to-one corresponding to and face toward the green color resists; and the B areas are respectively one-to-one corresponding to and face toward the blue color resists. Further, the in-plane retardation Re of the R area is $\lambda_R$/4 (Re=$\lambda_R$/4). Since a wavelength of a red light is ranged from 600 nm to 780 nm, such as $\lambda_R$ is 650 nm, the in-plane retardation Re of the R area is 650/4 (Re=650/4). Since a wavelength of a green light is ranged from 500 nm to 600 nm, such as $\lambda_G$ is 550 nm, the in-plane retardation Re of the G area is 550/4 (Re=550/4). Since a wavelength of a blue light is ranged from 380 nm to 500 nm, such as $\lambda_B$ is 450 nm, the in-plane retardation Re of the B area is 450/4 (Re=450/4). In some embodiments, the in-plane retardation Re is a phase retardation measured by using a light with an incident wavelength $\lambda$nm along a normal direction of the ¼ wavelength plate.

Further, in the present embodiment, the ¼ wavelength plate 14 is a liquid crystal plate. In order to achieve a purpose of controlling a value of Re, liquid crystals can be coated on a soft substrate to obtain the ¼ wavelength plate 14. Two methods can be used to dispose the ¼ wavelength plate 14 at the value of Re in the corresponding area, which are shown as follows:

Method 1: A thickness d in each of the areas of the ¼ wavelength plate 14 is controlled to control a specific value of Re of the corresponding area, which means that liquid crystal molecules with identical alignment angles in each of the areas, wherein a thickness d of each of the areas satisfies: d=Re/(Nx−Ny), wherein Nx is a refractive index of a light in the ¼ wavelength plate in a first direction, Ny is a refractive index of a light in the ¼ wavelength plate in a second direction, wherein the first direction and the second direction are vertical to each other and are both parallel to a plane of the ¼ wavelength plate.

Method 2: The thicknesses d in the areas of the ¼ wavelength plate are identical to each other, and the alignment angles of the liquid crystal molecules in each of the areas are disposed to fix the value of Re of the area in a predetermined value. For example, the alignment angles of the liquid crystal molecules are disposed to cause the in-plane retardation Re of the R area being 650/4 (Re=650/4), the in-plane retardation Re of the G area being 550/4 (Re=550/4), and the in-plane retardation Re of the B area being 450/4 (Re=450/4).

In the color filter substrate provided by the present invention, a layer of ¼ wavelength plate is added onto an upper polarizing sheet 13. The ¼ wavelength plate has corresponding areas with respect to each of color filter resists of a color resist layer. In-plane retardation Re of each of the areas is respectively corresponding to the color filter resists facing to the area, such that an extent of converting a linear polarizing light to a circular polarizing light can be apparently improved, and protection of users' eyes can be enhanced.

Figure 2:
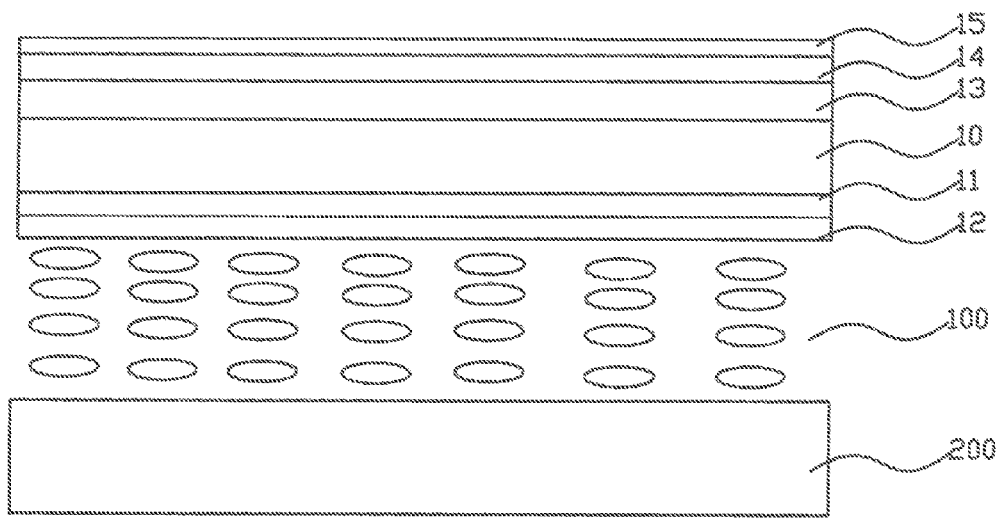
FIG. 2 is a structural schematic diagram of a preferred embodiment of a liquid crystal display panel of the present invention.

Refer to FIG. 2, which is a structural schematic diagram of a preferred embodiment of a liquid crystal display panel of the present invention.

The liquid crystal display panel in a preferred embodiment of the present invention comprises a color filter substrate (not shown), an array substrate 200, and a liquid crystal layer 100 disposed between the color filter substrate and the array substrate 200.

In some embodiments, the color filter substrate comprises a base substrate 10, a color resist layer 11, a flat layer 12, an upper polarizing sheet 13, a ¼ wavelength plate 14, and a protective film layer 15, wherein the color resist layer 11 is disposed on a surface of the base substrate 10 and the flat layer 12 is disposed on the color resist layer 11. The upper polarizing sheet 13 is disposed on the other surface of the base substrate 10. The ¼ wavelength plate 14 covers on the upper polarizing sheet 13. The protective film layer 15 covers and is disposed on the upper polarizing sheet 14.

Specifically, the base substrate 10 can be a glass substrate. The color resist layer 11 has a plurality of colored-filter color resists. For example, the color resist layer 11 can be a red/green/blue color resist layer, a red/green/blue/green color resist layer, a red/green/blue/white color resist layer and so on. Correspondingly, the colored-filter color resists can be also red/green/blue color resists, red/green/blue/green color resists, or red/green/blue/white color resists. Each of the colored-filter color resists is respectively used to filter a stray/undesired light and emit a light corresponding to a color. For example, a red color resist is used to filter other color lights in the white light and emit a red light.

In some embodiments, the flat layer 12 is formed from silicon dioxide, silicon nitride or mixtures thereof. Of course, other insulating materials commonly used in the liquid crystal field can also be used.

In some embodiments, the upper polarizing sheet 13 is a linear polarizing sheet comprising a first triacetate cellulose (TAC) layer, a polyvinyl alcohol (PVA) layer, and a second triacetate cellulose (TAC) layer, all of which are stacked in turn. The first triacetate cellulose layer and the second triacetate cellulose layer are mainly used to protect polarizers, fix polarizers, improve a contrast, improve a wide-angle and so on. The protective film layer 15 is used to protect the upper polarizing sheet 14.

In some embodiments, the ¼ wavelength plate has a plurality of areas, wherein the areas are respectively one-to-one corresponding to the colored-filter color resists, and the areas face toward a colored-filter color resist, respectively; wherein an in-plane retardation Re of the ¼ wavelength plate in each of the areas satisfies: Re=$\lambda$/4, wherein $\lambda$ is a wavelength of the light corresponding to the colored-filter color resist facing the area. For example, when the color resist layer is the red/green/blue color resist, the ¼ wavelength plate is corresponding to a physical structure of the color resist layer and has a plurality of R areas, G areas, and B areas. The R areas are respectively one-to-one corresponding to and face toward the red color resists; the G areas are respectively one-to-one corresponding to and face toward the green color resists; and the B areas are respectively one-to-one corresponding to and face toward the blue color resists. Further, the in-plane retardation Re of the R area is $\lambda_R$/4 (Re=$\lambda_R$/4). Since a wavelength of a red light is ranged from 600 nm to 780 nm, such as $\lambda_R$ is 650 nm, the in-plane retardation Re of the R area is 650/4 (Re=650/4). Since a wavelength of a green light is ranged from 500 nm to 600 nm, such as $\lambda_G$ is 550 nm, the in-plane retardation Re of the G area is 550/4 (Re=550/4). Since a wavelength of a blue light is ranged from 380 nm to 500 nm, such as $\lambda_B$ is 450 nm, the in-plane retardation Re of the B area is 450/4 (Re=450/4). In some embodiments, the in-plane retardation Re is a phase retardation measured by using a light with an incident wavelength $\lambda$nm along a normal direction of the ¼ wavelength plate 14.

Further, in the present embodiments, the ¼ wavelength plate 14 is a liquid crystal plate. In order to achieve a purpose of controlling a value of Re, liquid crystals can be coated on a soft substrate to obtain the ¼ wavelength plate 14. Two methods can be used to dispose the ¼ wavelength plate 14 at the value of Re in the corresponding area, which are shown as follows:

Method 1: A thickness d in each of the areas of the ¼ wavelength plate 14 is controlled to control a specific value of Re of the corresponding area, which means that liquid crystal molecules with identical alignment angles in each of the areas, wherein a thickness d of each of the areas satisfies: d=Re/(Nx−Ny), wherein Nx is a refractive index of a light in the ¼ wavelength plate in a first direction, Ny is a refractive index of a light in the ¼ wavelength plate in a second direction, wherein the first direction and the second direction are vertical to each other.

Method 2: The thicknesses d in the areas of the ¼ wavelength plate are identical to each other, and the alignment angles of the liquid crystal molecules in each of the areas are disposed to fix the value of Re of the area in a predetermined value. For example, the alignment angles of the liquid crystal molecules are disposed to cause the in-plane retardation Re of the R area to be 650/4 (Re=650/4), the in-plane retardation Re of the G area to be 550/4 (Re=550/4), and the in-plane retardation Re of the B area to be 450/4 (Re=450/4).

In the color filter substrate, the liquid crystal display panel and the liquid crystal display provided by the present invention, a layer of ¼ wavelength plate is added onto an upper polarizing sheet. The ¼ wavelength plate has corresponding areas with respect to each of color filter resists of a color resist layer. In-plane retardation Re of each of the areas is respectively corresponding to the color filter resists facing to the area, such that an extent of converting a linear polarizing light to a circular polarizing light can be apparently improved, and protection of users' eyes can be enhanced.

As described above, although the present invention has been described in preferred embodiments, they are not intended to limit the invention. One of ordinary skill in the art, without departing from the spirit and scope of the invention within, can make various modifications and variations, so the range of the scope of the invention is defined by the claims.

What is claimed is:

1. A color filter substrate, comprising:
    a base substrate;
    a color resist layer disposed on a surface of the base substrate and having a plurality of colored-filter color resists, wherein each of the colored-filter color resists is respectively configured to filter a stray light and emit a light corresponding to a color;
    an upper polarizing sheet disposed on the other surface of the base substrate; and a ¼ wavelength plate covering on the upper polarizing sheet and having a plurality of areas, wherein the areas are respectively one-to-one corresponding to the colored-filter color resists, and the areas face toward the corresponding colored-filter color resists, respectively;

wherein an in-plane retardation Re of the ¼ wavelength plate in each of the areas satisfies: Re=$\lambda$/4, wherein $\lambda$ is a wavelength of the light corresponding to the color; and wherein the ¼ wavelength plate is a liquid crystal plate and has liquid crystal molecules with identical alignment angles in each of the areas, wherein a thickness d of each of the areas satisfies: d=Re/(Nx−Ny), wherein Nx is a refractive index of a light in the ¼ wavelength plate in a first direction, Ny is a refractive index of a light in the ¼ wavelength plate in a second direction, wherein the first direction and the second direction are vertical to each other and are both parallel to a plane of the ¼ wavelength plate.

2. The color filter substrate according to claim 1, wherein the color resist layer is a red/green/blue color resist layer, a red/green/blue/green color resist layer, or a red/green/blue/white color resist layer.

3. The color filter substrate according to claim 1, wherein the ¼ wavelength plate is a liquid crystal plate and has an identical thickness in each of the areas, wherein the alignment angles of liquid crystal molecules of the ¼ wavelength plate in each of the areas are different predetermined values to cause Re=$\lambda$/4.

4. The color filter substrate according to claim 2, wherein the ¼ wavelength plate is a liquid crystal plate and has an identical thickness in each of the areas, wherein the alignment angles of liquid crystal molecules of the ¼ wavelength plate in each of the areas are different predetermined values to cause Re=$\lambda$/4.

5. The color filter substrate according to claim 1, further comprising a protective film layer disposed on the ¼ wavelength plate.

6. The color filter substrate according to claim 1, wherein the upper polarizing sheet comprises a first triacetate cellulose layer, a polyvinyl alcohol layer, and a second triacetate cellulose layer, all of which are stacked in turn.

7. A liquid crystal display panel, comprising a color filter substrate, an array substrate and a liquid crystal layer disposed between the color filter substrate and the array substrate, wherein the color filter substrate comprises:

a base substrate;

a color resist layer disposed on a surface of the base substrate and having a plurality of colored-filter color resists, wherein each of the colored-filter color resists is respectively configured to filter a stray light and emit a light corresponding to a color;

an upper polarizing sheet disposed on the other surface of the base substrate; and a ¼ wavelength plate covering on the upper polarizing sheet and having a plurality of areas, wherein the areas are respectively one-to-one corresponding to the colored-filter color resists, and the areas face toward the corresponding colored-filter color resists, respectively;

wherein an in-plane retardation Re of the ¼ wavelength plate in each of the areas satisfies: Re=$\lambda$/4, wherein $\lambda$ is a wavelength of the light corresponding to the color; and wherein the ¼ wavelength plate is a liquid crystal plate and has liquid crystal molecules with identical alignment angles in each of the areas, wherein a thickness d of each of the areas satisfies: d=Re/(Nx−Ny), wherein Nx is a refractive index of a light in the ¼ wavelength plate in a first direction, Ny is a refractive index of a light in the ¼ wavelength plate in a second direction, wherein the first direction and the second direction are vertical to each other and are both parallel to a plane of the ¼ wavelength plate.

8. The liquid crystal display panel according to claim 7, wherein the color resist layer is a red/green/blue color resist layer, a red/green/blue/green color resist layer, or a red/green/blue/white color resist layer.

9. A liquid crystal display, comprising: a liquid crystal display panel as claimed in claim 7.

\* \* \* \* \*